(12) United States Patent
Richardson

(10) Patent No.: US 12,728,370 B2
(45) Date of Patent: Sep. 8, 2026

(54) METHODS AND SYSTEMS FOR ORGANIC RECOVERY IN SOLVENT EXTRACTION

(71) Applicant: FREEPORT MINERALS CORPORATION, Phoenix, AZ (US)

(72) Inventor: Steven Richardson, Thatcher, AZ (US)

(73) Assignee: FREEPORT MINERALS CORPORATION, Phoenix, AZ (US)

( * ) Notice: Subject to any disclaimer, the term of this patent is extended or adjusted under 35 U.S.C. 154(b) by 0 days.

(21) Appl. No.: 19/322,510

(22) Filed: Sep. 8, 2025

(65) Prior Publication Data

US 2026/0001011 A1 Jan. 1, 2026

Related U.S. Application Data

(63) Continuation of application No. 19/171,790, filed on Apr. 7, 2025, now Pat. No. 12,434,174.

(Continued)

(51) Int. Cl.

*B01D 21/00* (2006.01)
*B01D 21/24* (2006.01)
*B01D 21/26* (2006.01)

(52) U.S. Cl.

CPC ..... *B01D 21/2405* (2013.01); *B01D 21/0087* (2013.01); *B01D 21/2433* (2013.01); *B01D 21/26* (2013.01); *B01D 2257/70* (2013.01)

(58) Field of Classification Search

CPC . B01D 21/0076; B01D 21/26; B01D 2257/70

See application file for complete search history.

(56) References Cited

U.S. PATENT DOCUMENTS 5,219,467 A 6/1993 Nyman et al.
5,458,414 A 10/1995 Crump et al.

(Continued)

FOREIGN PATENT DOCUMENTS

CN 211226811 U * 8/2020
CN 113750587 12/2021

(Continued)

OTHER PUBLICATIONS

Yang, Feng-bin et al—CN 115180685A machine translation—Oct. 14, 2022 (Year: 2022).*

(Continued)

*Primary Examiner* — Bradley R Spies

(74) *Attorney, Agent, or Firm* — Snell & Wilmer L.L.P.

(57) ABSTRACT

A device for recovering entrained organic particles from an aqueous solution is provided. The device comprises a tank configured to receive a mixed solution through an inlet, wherein the mixed solution comprises an aqueous solution and organic particles, a plurality of curved impellers configured to impel a torque on the mixed solution, wherein in response to receiving the torque the mixed solution moves in a rotational motion within the tank, a deflector wall coupled to the floor extending vertically from the floor and surrounding the plurality of curved impellers to form an inner well configured to direct a flow of the rotating mixed solution towards a top surface of the tank, and a skim launder coupled to a boundary wall of the tank and positioned at the top surface, wherein the skim launder is configured to recover organic particles from the tank as they separate from the aqueous solution.

18 Claims, 8 Drawing Sheets

Related U.S. Application Data

(60) Provisional application No. 63/631,863, filed on Apr. 9, 2024.

(56) References Cited

U.S. PATENT DOCUMENTS

| | | | | |
|---|---|---|---|---|
| 6,358,407 | B1 * | 3/2002 | Liao | C02F 1/5245 210/256 |
| 8,123,955 | B2 | 2/2012 | Lake et al. | |
| 8,906,233 | B2 | 12/2014 | Messick et al. | |
| 12,434,174 | B1 | 10/2025 | Richardson | |
| 2002/0104296 | A1 * | 8/2002 | Cook | F04C 23/00 55/467 |
| 2003/0173262 | A1 | 9/2003 | Jounela | |
| 2004/0245151 | A1 | 12/2004 | Lilja et al. | |
| 2006/0165569 | A1 | 7/2006 | Giralico et al. | |
| 2011/0100931 | A1 | 5/2011 | Lake et al. | |
| 2013/0270169 | A1 * | 10/2013 | Messick | B01D 21/245 210/257.1 |

FOREIGN PATENT DOCUMENTS

| | | | | |
|---|---|---|---|---|
| CN | 115180685 A | * | 10/2022 | E21B 43/34 |
| WO | WO20250217025 | | 10/2025 | |

OTHER PUBLICATIONS

Wang, Cheng-wen et al—CN 211226811U machine translation—Aug. 11, 2020 (Year: 2020).*

PCT International Search Report and Written Opinion from PCT/US2025/023397 dated Jun. 11, 2025.

USPTO Notice of Allowance from U.S. Appl. No. 19/171,790 dated May 27, 2025.

Reply to PCT Written Opinion with PCT Demand from PCT/US2025/023397 dated Aug. 11, 2025.

* cited by examiner

METHODS AND SYSTEMS FOR ORGANIC RECOVERY IN SOLVENT EXTRACTION

CROSS-REFERENCE TO RELATED APPLICATIONS

This application is a continuation application of and claims priority to U.S. patent application Ser. No. 19/171,790, entitled "METHODS AND SYSTEMS FOR ORGANIC RECOVERY IN SOLVENT EXTRACTION," which was filed on Apr. 7, 2025 (the "790 Application"). The '790 application claims priority to and the benefit of U.S. Provisional Patent Application Ser. No. 63/631,863, entitled "METHODS AND SYSTEMS FOR ORGANIC RECOVERY IN SOLVENT EXTRACTION," which was filed Apr. 9, 2024 (the "'863 Application"). The aforementioned applications are hereby incorporated by reference herein in their entireties for all purposes.

FIELD OF INVENTION

The present disclosure generally relates to methods and systems for separating components of a mixture of liquids and organic particles. More particularly, the invention relates to systems and methods for reducing entrained organic particles in the aqueous flow stream and recovering organic particles from the stream.

BACKGROUND

Solvent extraction systems are often utilized to extract metal complexes from a mixture of liquids. Mixer-settlers are one extraction circuit in which compounds separate by density. In the process of metal extraction, a pregnant leach solution containing a metal value enters the extractant section of the mixer-settler and mixes with an extractant substance, commonly called organic. During the mixing, the metal value is extracted from the pregnant leach solution into the organic to produce a loaded organic stream and a raffinate. The loaded organic stream then flows to the stripping section of the mixer-settler where a stripping solution may be added to the loaded organic stream, enabling the metal value to bind to the stripping solution. Within all sections of the mixer-settler, organic particles are less dense than the various aqueous flow streams and rise above the aqueous flow streams' higher densities. Upon separation of the organic particles from the aqueous flow streams, the organic particles typically join a larger organic launder layer.

However, when the aqueous flow stream enters the mixer-settler at a high velocity, organic particles may become entrained in the aqueous flow stream and never join the larger organic layer. This results in multiple issues in both upstream and downstream processes. For example, entrainment allows for the potential of unwanted impurities being included in the electrowinning process and decreasing the purity of the copper cathode. Additionally, organic particles entrained in raffinate solutions recycled back to the leaching process decrease the efficiency of leaching operations, negatively impacting metal recovery. The organic can cause buildup in leach heap emitters and decrease leaching solution flow. Further, organic that ends up within the leach heap can plug solution channels within the heap, impact the chemistry of leaching solutions, and/or inhibit naturally occurring beneficial microorganisms. An efficient system and method of reducing entrained organic particles in the aqueous flow stream may prevent these potential issues.

SUMMARY

The present disclosure provides an improved system and method for reducing entrained organic particles in an aqueous flow stream.

In one aspect of the present invention, a device for organic recovery is provided. The device includes a tank configured to receive a mixed solution through an inlet, wherein the mixed solution comprises an aqueous solution and organic particles, a plurality of curved impellers coupled to a floor of the tank configured to impel a torque on the mixed solution, wherein in response to receiving the torque the mixed solution moves in a rotational motion within the tank, a deflector wall coupled to the floor extending vertically from the floor and surrounding the plurality of curved impellers to form an inner well configured to direct a flow of the rotating mixed solution vertically upwards towards a top surface of the tank, and a skim launder coupled to a boundary wall of the tank and positioned at the top surface, wherein the skim launder is configured to recover organic particles from the tank as they separate from the aqueous solution. In various embodiments, the deflector wall further comprises a deflector ring configured to restrict the amount of mixed solution exiting the inner well, wherein the deflector ring is coupled to a top surface of the deflector wall.

In various embodiments, the device further includes a plurality of baffles extending horizontally from the inlet to the boundary wall configured to float at an interface between the aqueous solution and a coalesced layer of organic particles, wherein the plurality of baffles impedes the flow of the rotating mixed solution at the top surface, a plurality of inlet baffle guides coupled to the inlet, and a plurality of boundary baffle guides coupled to the boundary wall, wherein each inlet baffle guide in the plurality of inlet baffle guides has a corresponding boundary baffle guide in the plurality of boundary baffle guides, and wherein each corresponding pair is configured to restrain the horizontal movement of a baffle in the plurality of baffles.

In various embodiments, the plurality of baffles comprises a density that is less than a density of the aqueous solution and more than a density of the coalesced layer of organic particles. In various embodiments, each baffle in the plurality of baffles terminates at each end in an endcap, wherein the endcap is configured to restrain the baffle within each corresponding pair of baffle guides. In various embodiments, each inlet baffle guide in the plurality of inlet baffle guides and each boundary baffle guide in the plurality of boundary baffle guides includes two parallel vertically aligned bars, and a baffle restraint configured to set an upper limit for vertical movement of the plurality of baffles within the tank, wherein the baffle restraint intersects the two parallel vertically aligned bars perpendicularly.

In various embodiments, the device further includes, a discharge gallery positioned at the floor of the tank and configured to separate organic particles from the mixed solution, a plurality of accumulation zones disposed within a horizontal surface of the discharge gallery, wherein each accumulation zone in the plurality of accumulation zones is a raised section of the horizontal surface and is configured to trap the separated organic particles and prevent them from remixing with the aqueous solution, and a plurality of collection pipes extending vertically from the plurality of accumulation zones to the top surface, configured to deposit the separated organic particles on the top surface. In various embodiments, the device further includes a drip channel coupled to each collection pipe in the plurality of collection pipes and positioned at the top surface, wherein the drip channel is configured to guide the separated organic particles into the skim launder.

In various embodiments, the device further includes a separation ring disposed horizontally along the boundary wall of the tank and positioned between the floor and the top surface, wherein the separation ring is configured to separate organic particles from the mixed solution, and wherein the separation ring comprises a plurality of accumulation zones disposed within a horizontal surface. In various embodiments the device further includes an equalizer pipe coupled to the floor and intersecting the deflector wall configured to maintain a static level within the tank.

In another aspect of the present invention, a method for recovering entrained organic particles from an aqueous solution is provided. The method includes pumping, via an inlet, a mixed solution into a recovery tank, wherein the mixed solution comprises an aqueous solution and organic particles, directing, via the inlet, a flow of the mixed solution towards an inner well of the recovery tank, wherein the inner well comprises a plurality of curved impellers coupled to a floor of the recovery tank and configured to impel a torque onto the mixed solution, wherein in response to receiving the torque the mixed solution moves in a rotational motion within the recovery tank, and a deflector wall extending vertically from the floor and surrounding the plurality of curved impellers and configured to direct a flow of the rotating mixed solution vertically upwards towards a top surface of the recovery tank, and recovering, via a skim launder, organic particles from the recovery tank as they separate from the aqueous solution, wherein the skim launder is coupled to a boundary wall of the recovery tank and positioned at the top surface.

In various embodiments, the method further includes impeding, via a baffle system, the flow of the rotating mixed solution at the top surface, wherein the baffle system is configured to float at an interface between the aqueous solution and a coalesced layer of organic particles, and wherein the baffle system extends horizontally from the inlet to the boundary wall.

In various embodiments, the method further includes separating, via a discharge gallery, organic particles from the mixed solution, wherein the discharge gallery is positioned at the floor of the tank, preventing, via a plurality of accumulation zones, the separated organic particles from remixing with the aqueous solution, wherein each accumulation zone in the plurality of accumulation zones is a raised section of a horizontal surface of the discharge gallery, and depositing, via a plurality of collection pipes, the separated organic particles onto the top surface, wherein each collection pipe in the plurality of collection pipes extends vertically from the plurality of accumulation zones to the top surface. In various embodiments, the method further includes guiding, via a plurality of drip channels, the separated organic particles into the skim launder, wherein each drip channel in the plurality of drip channels are coupled to a collection pipe in the plurality of collection pipes and positioned at the top surface.

In various embodiments, the method further includes separating, via a separation ring, organic particles from the mixed solution, wherein the separation ring is disposed horizontally along the boundary wall of the tank and positioned between the floor and the top surface, and wherein the separation ring comprises a plurality of accumulation zones disposed within a horizontal surface. In various embodiments, the method further includes maintaining, via an equalizer pipe, a static level within the tank, wherein the equalizer pipe is coupled to the floor and intersects the deflector wall.

BRIEF DESCRIPTION OF THE DRAWINGS

The subject matter is pointed out with particularity and claimed distinctly in the concluding portion of the specification. A more complete understanding, however, may best be obtained by referring to the detailed description and claims when considered in connection with the following drawing figures.

DETAILED DESCRIPTION

Figure 1:
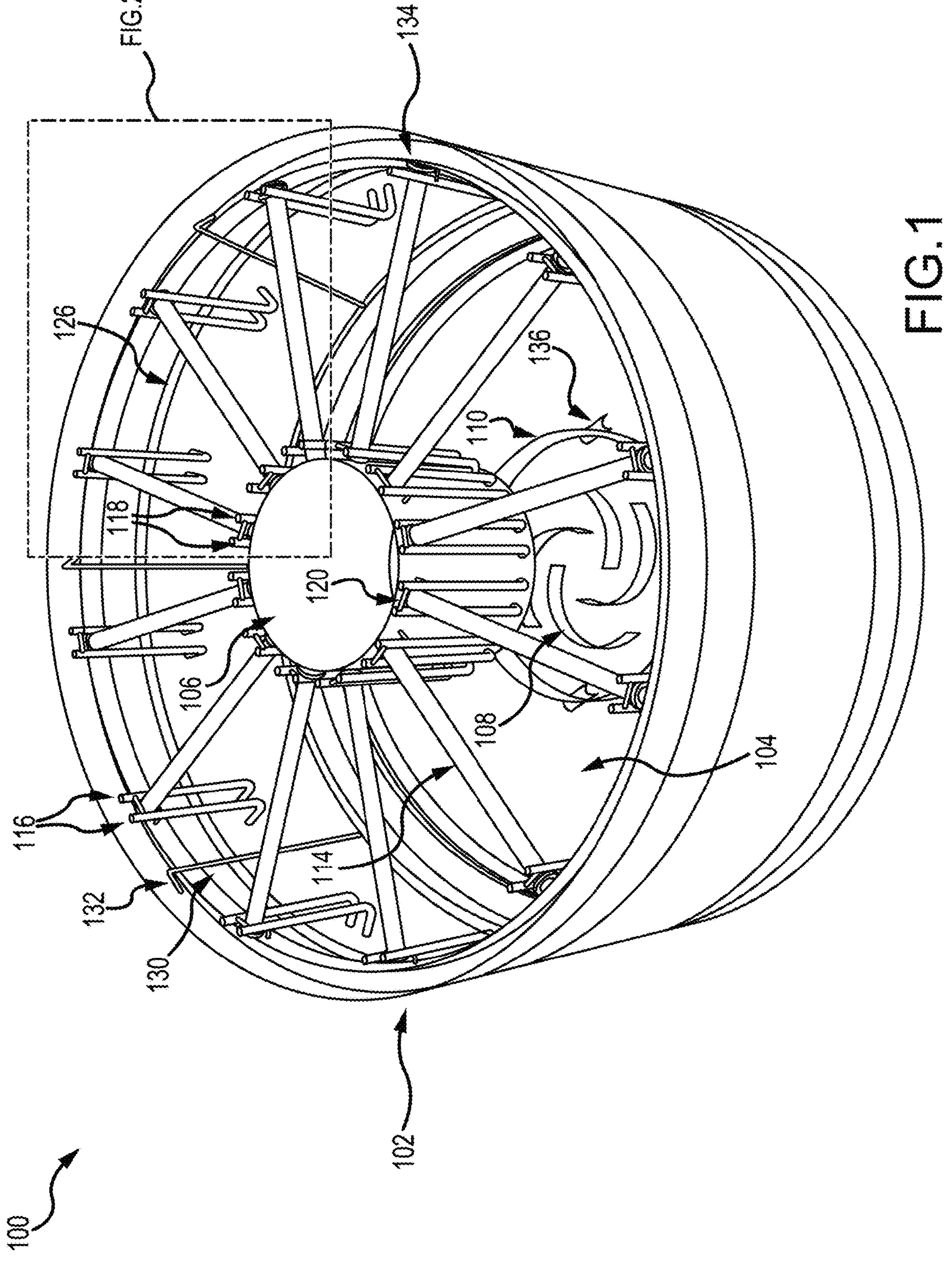
FIG. 1 is a perspective view of a device according to this disclosure.

The following description is merely exemplary in nature and is not intended to limit the present invention, its applications, or its uses. It should be understood that throughout the drawings, corresponding reference numerals indicate like or corresponding parts and features. The description of specific examples indicated in various embodiments of the present invention are intended for purposes of illustration only and are not intended to limit the scope of the invention disclosed herein. Moreover, recitation of multiple embodiments having stated features is not intended to exclude other embodiments having additional features or other embodiments incorporating different combinations of the stated features.

Furthermore, the detailed description of various embodiments herein makes reference to the accompanying drawing figures, which show various embodiments by way of illustration. While the embodiments are described in sufficient detail to enable those skilled in the art to practice the invention, it should be understood that other embodiments may be realized, and that logical and mechanical changes may be made without departing from the spirit and scope of the present invention. Thus, the detailed description herein is presented for purposes of illustration only and not of limitation. For example, steps or functions recited in descriptions of any method, system, or process may be executed in any order and are not limited to the order presented. Moreover, any of the step or functions thereof may be outsourced to or performed by one or more third parties. Furthermore, any reference to singular includes plural embodiments, and any reference to more than one component may include a singular embodiment.

In general, the present disclosure relates to methods and systems for reducing the amount of entrained organic particles in an aqueous phase of hydrometallurgical metal recovery processing, thereby increasing purity of metal recovery and decreasing costs associated with recovering metal values from a metal-bearing material.

In accordance with various embodiments, the metal-bearing material may be an ore, a concentrate, a process residue, or any other material from which metal values may be recovered. In accordance with various embodiments, the metal-bearing material may comprise chalcocite, pyrite, chalcopyrite, arsenopyrite, bornite, covellite, digenite, cobaltite, enargite, galena, greenockite, millerite, molybdenite, orpiment, pentlandite, pyrrhotite, sphalerite, stibnite, and/or any other suitable metal-bearing ore material. Preferably, the metal-bearing material may comprise primary or secondary sulfides such as chalcocite, bornite, pyrite, or chalcopyrite, or a blend of such mineral species. Various aspects and embodiments of the present invention, however, prove particularly advantageous in connection with the recovery of copper from copper sulfide ores such as, for example, chalcopyrite ($CuFeS_2$), chalcocite ($Cu_2S$), bornite ($Cu_5FeS_4$), covellite (CuS), enargite ($Cu_3AsS_4$), digenite ($Cu_9S_5$), and mixtures thereof.

In accordance with various embodiments, the metal value may be copper, nickel, zinc, silver, gold, germanium, lead, arsenic, antimony, chromium, molybdenum, rhenium, tungsten, iron, ruthenium, osmium, cobalt, rhodium, iridium, palladium, platinum, uranium, rare earth metals, and mixtures thereof.

In hydrometallurgical mineral processing operations, metal values are extracted from ore through a leaching process. Typical leaching processes comprise contacting a metal-bearing material with an aqueous solution containing a leaching agent which extracts a metal value from the metal-bearing material into solution, producing a pregnant leaching solution. The pregnant leaching solution containing the metal value can then be treated by, for example, solution extraction (SX), wherein the pregnant leach solution flows into an extraction stage of an SX plant where it is mixed with an organic solution comprising a metal-specific extraction reagent to extract the metal value from the pregnant leach solution into the organic solution, producing a barren aqueous solution and a loaded organic.

After the metal value is removed from the pregnant leaching solution into the organic solution, the barren aqueous solution, now called the raffinate, may be recycled back to the leaching process, recycled to the front of a solid-liquid separation process, and/or forwarded to secondary metal extraction processes, while the loaded organic flows to a stripping stage of an SX plant. In the stripping section, the loaded organic is mixed with a stripping solution, such as, for example, a lean electrolyte solution, comprising a metal-specific stripping reagent to pull the metal value from the loaded organic, forming a barren organic and rich electrolyte. The barren organic may be recycled back within the SX process, while the rich electrolyte moves towards an electrowinning (EW) plant for further processing. While described simply above, an SX plant may comprise any number of extraction and stripping stages, and any configuration of components within an SX plant is within the scope of the invention.

A typical SX plant comprises mixer-settlers to perform the various extraction and stripping stages within the SX process. Mixer-settlers utilize the different densities of the various mixed solutions to separate them into organic and aqueous phases. While they are relatively effective at this separation, organic particles often remain entrained within aqueous solutions, negatively impacting both upstream and downstream processes. Entrainment can occur when the mixed organic and aqueous solutions are not given enough time to separate into their respective phases. For this reason, certain SX plants will include organic recovery tanks, wherein the aqueous solution will flow into the tank to allow for an additional opportunity for the entrained organic particles to separate out from the aqueous solution and be recovered. These tanks allow for increased purification of the aqueous phase and recovery of organic material for reuse.

Figure 7:
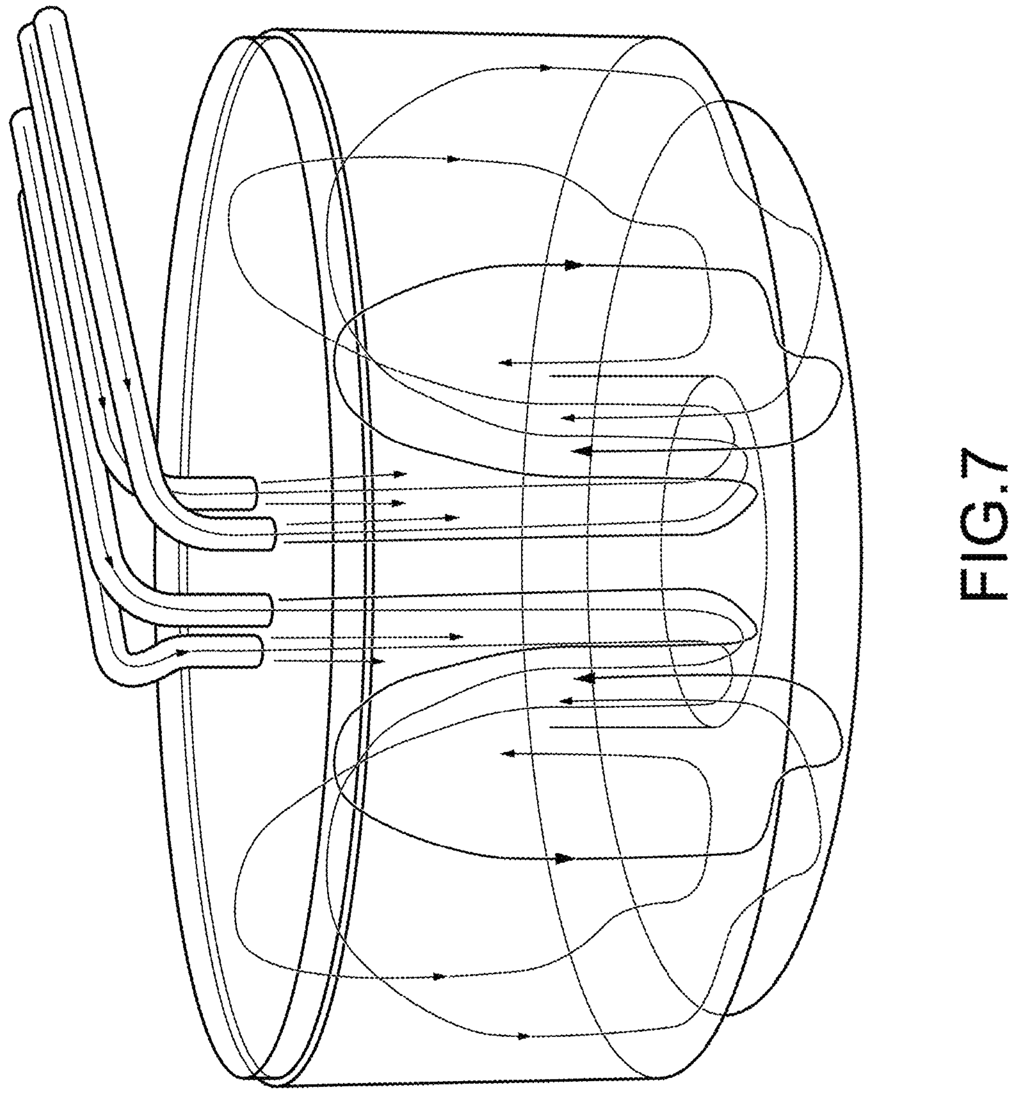
FIG. 7 is an example of the flow pattern that occurs in a standard tank.

In standard tanks, the aqueous solution is pumped from the mixer-settler into the tank and held for a period of time in which the entrained organic particles rise to the top of the tank and flow into organic launders disposed around the perimeter of the tank. Organic floating on the surface of the tank is further recovered through the use of skimming devices. However, due to the flow patterns within the tank as the aqueous solution is pumped in, further organic particles remain entrained in the aqueous solution and are not recovered. Generally, as the aqueous solution enters the tank, it hits the bottom of the tank and then rebounds back up vertically before moving across the surface and down the sides of the tank to hit the bottom and repeat the same flow process. This flow stream moves at a high velocity and with a high degree of agitation, minimizing the separation of organic particles from the aqueous solution, resulting in an appreciable portion of organic entrainment remaining. The flow patterns of a standard tank are illustrated in FIG. 7.

In the instant invention, an improved scavenger tank is disclosed that controls the velocity of the aqueous solution in the tank, resulting in a higher degree of separation between the aqueous solution and organic particles, minimizing entrainment and enabling increased recovery of organic.

Referring now to FIG. 1 a scavenger tank 100 in accordance with the present disclosure is shown for improving the separation of entrained organic from an aqueous solution. In various embodiments, the aqueous solution can be any solution that comprises an aqueous phase of SX, such as, for example, raffinate or rich electrolyte solution. Tank 100 comprises an outer boundary wall 102 and a floor 104. Tank 100 further comprises an inlet 106, which is disposed within tank 100 and positioned at a central location. Inlet 106 is configured to allow aqueous solution to be pumped through it and into tank 100. For example, in various embodiments, inlet 106 may take the form of a vertically-oriented hollow tube that is open at both its top and bottom surfaces.

A plurality of impellers 108 are coupled to floor 104. Impellers 108 are configured to impel a torque on the aqueous solution as it enters tank 100 through inlet 106 and hits floor 104. Impellers 108 may be configured in any shape sufficient to impel a torque on the aqueous solution. In various embodiments, impellers 108 may be a curved vane. As the aqueous solution hits floor 104, its flow stream naturally moves horizontally along floor 104, eventually contacting impellers 108. As the aqueous solution flows along impellers 108, the contour of the impellers 108 applies a torque to the aqueous solution, causing the solution's flow stream to move in a rotational motion tangential to outer boundary wall 102. This rotational motion decreases the velocity of the aqueous solution, allowing the entrained organic particles more time to separate out from the solution, therefore reducing entrainment. As the organic particles separate from solution, they float up towards the surface of tank 100 where they coalesce into a cohesive organic layer that can be skimmed off and recovered.

In various embodiments, each impeller in the plurality of impellers 108 may be positioned relative to each other in a variety of configurations. For example, in various embodiments, impellers 108 may be configured in a spiral, wherein some impellers are closer to outer boundary wall 102 and others are further from outer boundary wall 102. In other embodiments, each impeller in the plurality of impellers 108 may all be equidistant from outer boundary wall 102 and rotated at an angle relative to the impeller behind it. For example, each impeller may be rotated counterclockwise at an angle in the range of about 30° to about 60° from the impeller behind it. In such a configuration, when looking at impellers 108 from a top-down view, the center point of each impeller in the plurality of impellers 108 would be configured in a circle, when taken as a whole. An example of this configuration can be seen in FIG. 3.

Figure 5:
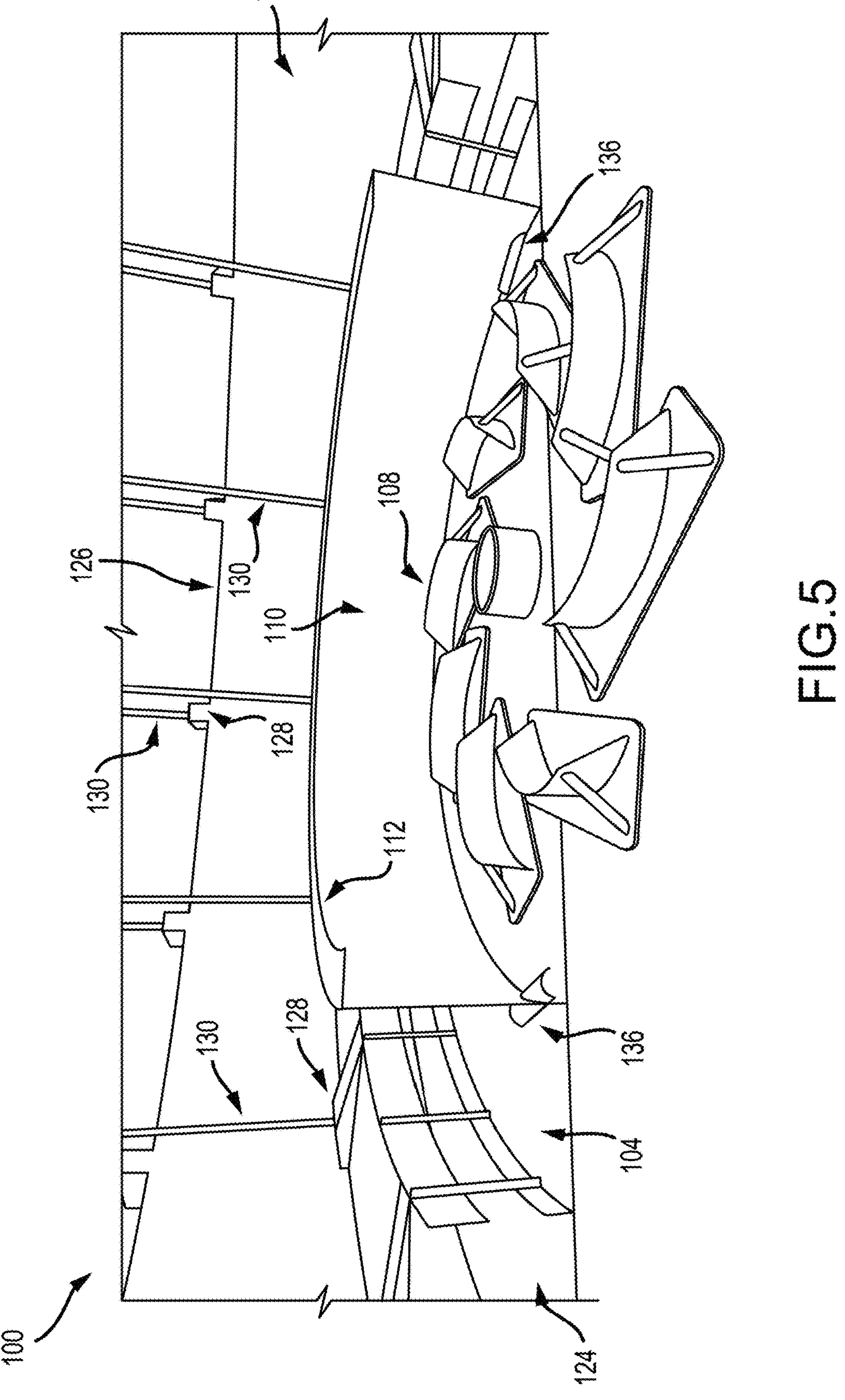
FIG. 5 is a magnified view of the area enclosed by the dotted box toward the right section of FIG. 3.

In various embodiments, tank 100 may further comprise a deflector wall 110. Deflector wall 110 is coupled to floor 104 and surrounds impellers 108, forming an inner well. Deflector wall 110 directs the flow stream of the aqueous solution vertically upwards to the surface of tank 100 as the solution exits impellers 108. Directing the flow stream in this way forms a low-speed and up-welling vortex within tank 100, decreasing overall agitation within the tank. Deflector wall 110 may comprise deflector ring 112. Deflector ring 112, as seen in FIG. 5, is coupled to the top surface of deflector wall 110 and extends away from deflector wall 110 towards the center of tank 100 for a distance sufficient to restrict the amount of aqueous solution exiting the inner well and reduce the up-welling velocity, further controlling the flow stream.

In various embodiments, with continued reference to FIG. 1, a plurality of baffles 114 horizontally extend from the inlet 106 to the boundary wall 102 of tank 100. Baffles 114 may be positioned equidistance around inlet 106 and may be comprised of any anti-corrosive material with a density in between that of the aqueous solution and organic. However, any configuration and material which serves to promote the advantage of the instant invention may be used. In various embodiments, baffles 114 are high-density polyethylene (HDPE). The intermediate density of baffles 114 allows them to float within tank 100 at the interface between the aqueous solution and the organic layer, enabling the depth of the organic layer to be easily identified and recovered. Baffles 114 further impede the flow stream velocity at the upper surface of tank 100, preventing the coalesced organic layer from being reagitated and remixing with the aqueous solution.

Figure 2:
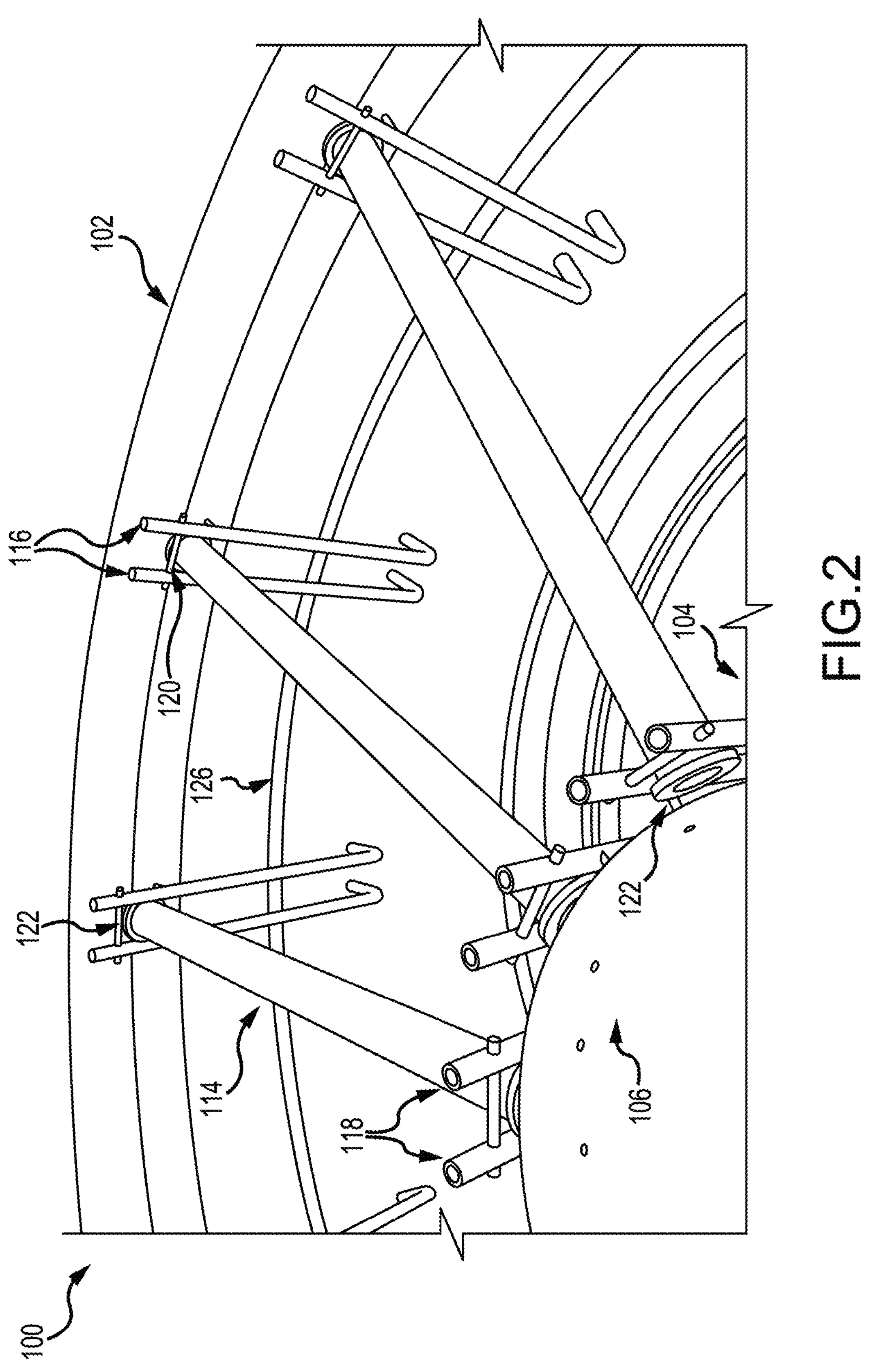
FIG. 2 is a magnified view of the area enclosed by the dotted box in FIG. 1.
Figure 3:
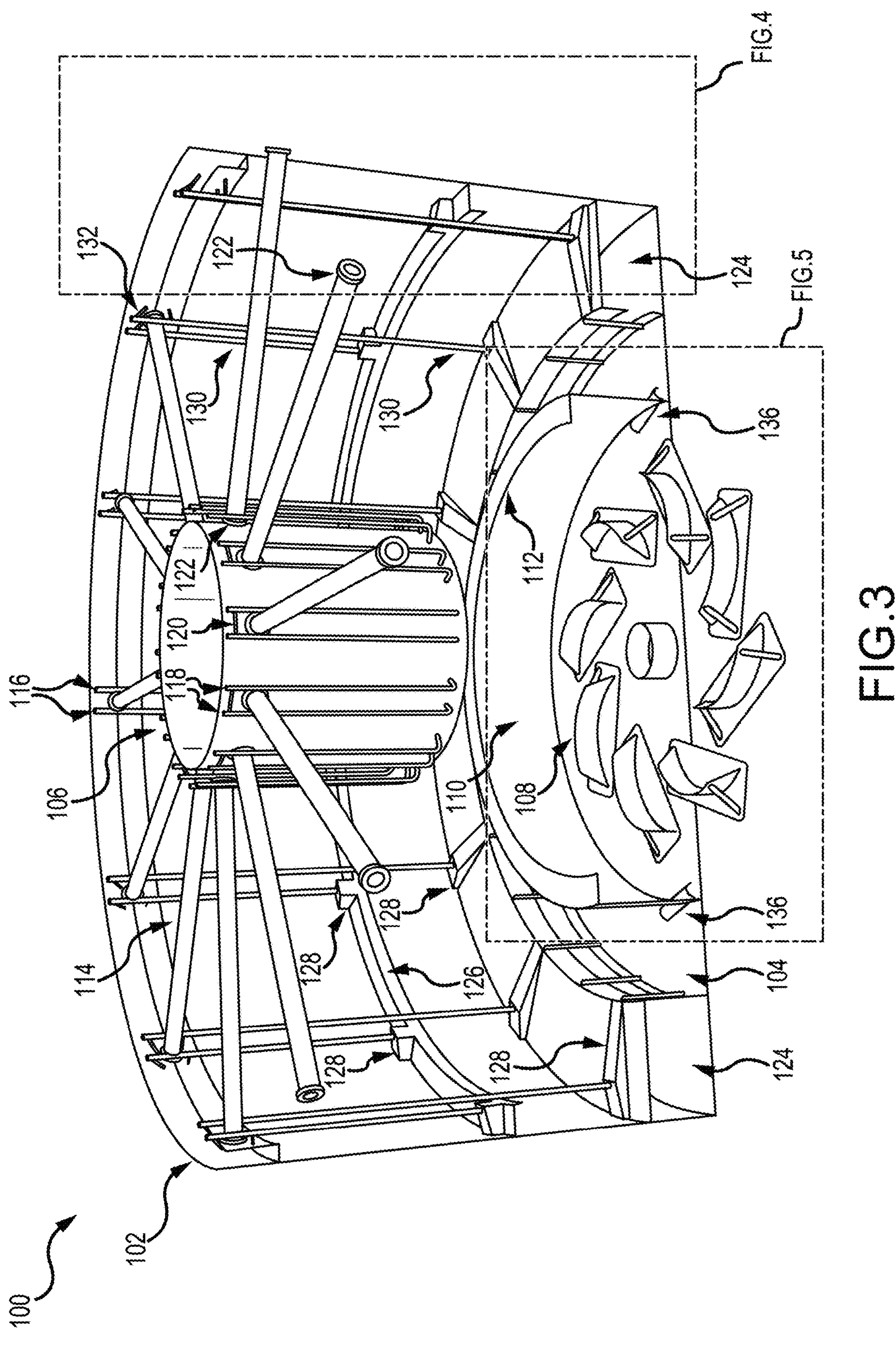
FIG. 3 is a cross-sectional side view of a device according to this disclosure.

With reference now to FIGS. 2 and 3, baffles 114 are suitably held in position horizontally between boundary wall 102 and inlet 106 by a plurality of boundary guides 116 and a plurality of inlet guides 118. Boundary guides 116 are coupled to boundary wall 102 and inlet guides 118 are coupled to inlet 106. Each guide in the plurality of boundary guides 116 and the plurality of inlet guides 118 may be comprised of a pair of parallel bars, wherein the distance between the parallel bars is preferably greater than the width of each baffle in the plurality of baffles 114. Each guide in the plurality of boundary guides 116 has a corresponding guide in the plurality of inlet guides 118, wherein the corresponding guides are positioned across from each other between the boundary wall 102 and the inlet 106. In this way, each pair of corresponding guides acts as a track for each baffle in the plurality of baffles 114 to move vertically within the tank 100.

In various embodiments, a baffle restraint 120 perpendicularly intersects the pair of parallel bars in each guide in the plurality of boundary guides 116 and inlet guides 118 and is positioned above each baffle in the plurality of baffles 114. Baffle restraint 120 sets the upper limit of how close to the surface of tank 100 baffles 114 can rise.

In various embodiments, both sides of each baffle in the plurality of baffles 114 terminate in an endcap 122, which is positioned behind the pair of parallel bars of each guide in the plurality of boundary guides 116 and inlet guides 118, such that each endcap 122 is in contact with the boundary or inlet facing surface of the parallel bars, respectively. The distance between the parallel bars is preferably smaller than the width of each endcap 122. The configuration of the boundary guides 116, inlet guides 118, baffle restraints 120, and endcaps 122 in such an arrangement, in accordance with one embodiment of the instant invention, therefore fixes each baffle in the plurality of baffles 114 in position horizontally while leaving vertical movement unfixed. In such embodiments, as the level in tank 100 increases or decreases as it is filled or emptied, baffles 114 can float up or down with it, ensuring limited agitation in the organic layer through the entirety of the operation.

In various embodiments, with continued reference to FIG. 3, tank 100 further comprises a discharge gallery 124, positioned at the floor 104 and spanning the entirety of boundary wall 102. As the aqueous solution rotates within tank 100, the engrained organic particles begin to separate out and rise to the surface. However, as the aqueous solution is in constant movement, the organic particles may get remixed into the aqueous solution and fail to reach the surface and coalesce into the organic layer. Discharge gallery 124 comprises an opening facing towards the center of the tank, allowing aqueous solution to flow in, and a horizontal top surface extending from boundary wall 102 towards the center of the tank for a distance sufficient to trap the organic particles within the discharge gallery 124. This allows an increasing amount of organic particles to accumulate in a lower agitation area of tank 100.

In various embodiments, separation ring 126 is configured similarly to discharge gallery 124, such that it comprises a horizontal surface spanning the entirety of boundary wall 102 and extending from boundary wall 102 towards the center of tank 100. Separation ring 126 is positioned within tank 100 between the surface of the tank 100 and the floor 104 of the tank, and is configured to trap organic particles underneath the horizontal surface to allow for the organic particles to accumulate. Separation ring 126 further sets the lower limit of how far baffles 114 can travel down into the tank. In various embodiments, separation ring 126 may act as a flow disruptor, inhibiting flow streams from traveling directly vertically downward along boundary wall 102 towards discharge gallery 124. In such embodiments, flow streams are thus compelled to continue moving in a rotational motion around tank 100, increasing residence time and allowing for an increased number of organic particles to separate out from the aqueous solution.

In various embodiments, with continued reference to FIG. 3, a plurality of accumulation zones 128 are interspersed within the horizontal surfaces of discharge gallery 124 and separation ring 126 and comprise raised sections of the horizontal surface configured to catch accumulated masses of organic particles. Each accumulation zone in the plurality of accumulation zones 128 is coupled to a collection pipe in a plurality of collection pipes 130. Collection pipes 130 extend vertically from the accumulation zones 128 to the surface of the tank 100. As the accumulated masses of organic particles are caught in the accumulation zones 128, they rise through collection pipes 130 and are discharged at the surface of tank 100. In various embodiments, collection pipes 130 each further comprise a drip channel 132, configured to direct organic particles from collection pipes 130 into a skim launder 134. In various embodiments, collection pipes 130 may function as boundary baffle guides 116.

Figure 4:
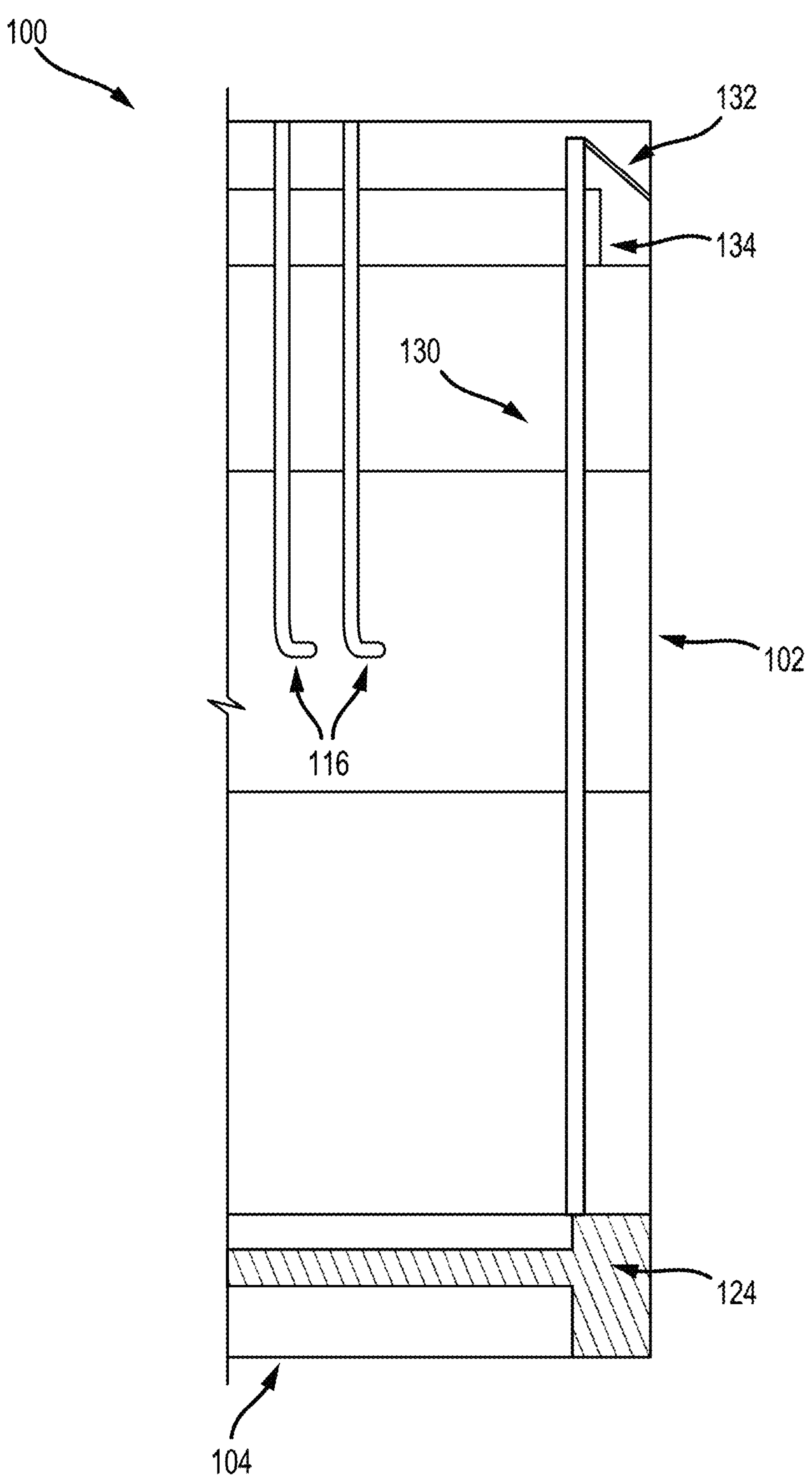
FIG. 4 is a magnified view of the area enclosed by the dotted box toward the bottom section of FIG. 3.

In various embodiments, with reference to FIGS. 3 and 4, skim launder 134 is positioned at the surface of tank 100 and spans the entirety of boundary wall 102. Skim launder 134 is configured to capture and remove organic particles from tank 100. As the surface level within tank 100 rises above skim launder 134, the coalesced organic layer overflows into it and is recovered from tank 100. Further, the organic particles that rose through the collection pipes 130 flow down their respective drip channel 132 directly into skim launder 134. Skim launder 134 may comprise any configuration sufficient to capture and remove organic particles from tank 100. In various embodiments, skim launder 134 may comprise a horizontally aligned cylinder or cube with an open-top surface, resembling, for example, a rain gutter.

In various embodiments, with reference to FIG. 5, tank 100 may comprise a plurality of equalizer pipes 136, coupled to floor 104 and intersecting the deflector wall 110. Each equalizer pipe in the plurality of equalizer pipes 136 comprises a semicylindrical tube, wherein the curved portion of the semicylinder faces the surface of tank 100 and is configured to maintain the same static level within and outside of deflector wall 110. Equalizer pipes 136 advantageously terminate in two open ends, one disposed within deflector wall 110 and one disposed outside of deflector wall 110. Equalizer pipes 136 are positioned through deflector wall 110 in such a way that the rotating aqueous solution is prevented from exiting through them while tank 100 is in operation. For example, if the aqueous solution rotates counterclockwise, equalizer pipes 136 may be placed at an angle rotated clockwise in the range of about 60° to about 80° from a line normal to the deflector wall 110.

In addition to maintaining the same static solution levels within and outside of the inner well formed by deflector wall 110, equalizer pipes 136 allow the aqueous solution within deflector wall 110 to flow out into tank 100 when it is drained, ensuring tank 100 can completely empty, as needed.

In another exemplary embodiment, a tank in accordance with the present disclosure may receive a horizontal flow of aqueous solution into a vertical central cylinder of the tank, with the flow entering at a location proximate the tank floor.

Figure 6:
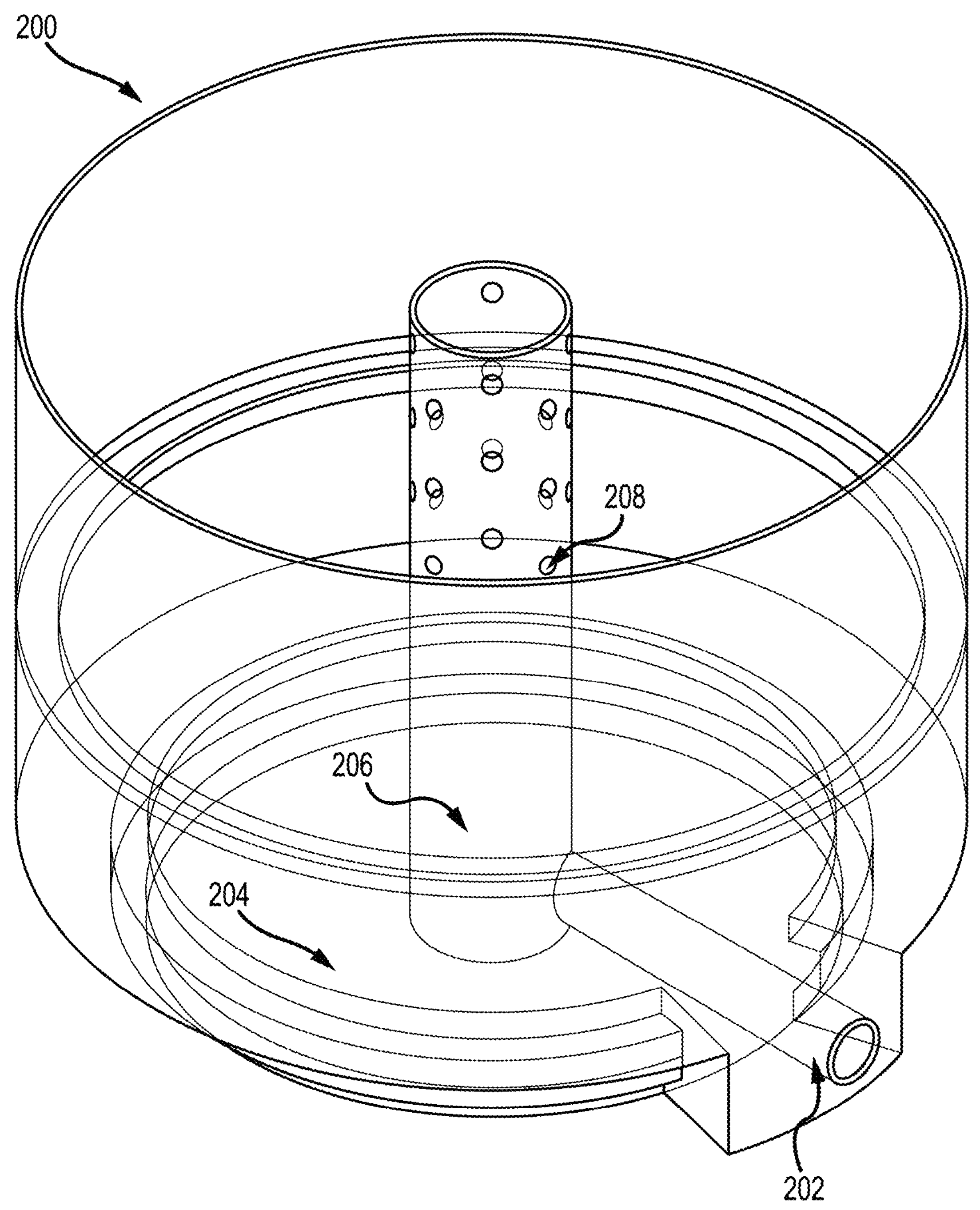
FIG. 6 is a perspective view of a device according to this disclosure.

Referring now to FIG. 6, a tank 200 may comprise a horizontal inlet feed 202 configured to deliver a flow of aqueous solution to the tank 200 at a location proximate the tank floor 204. In various embodiments, the horizontal inlet feed 202 is coupled to a vertically oriented central cylinder 206 of the tank 200. The horizontal inlet feed 202 may be coupled to the central cylinder 206, for example, in a position that is off-centered or tangential to the central cylinder 206 to induce horizontal swirling of the aqueous solution about a center vertical axis of the central cylinder 206.

In various embodiments, with continued reference to FIG. 6, the central cylinder 206 may be coupled to the tank floor 204 or otherwise closed off at its bottom surface, inducing the horizontal swirling of the aqueous flow to continue upwardly in a vortex-like manner toward an open end of the central cylinder 206. Such a flow pattern may further promote mixing within the tank 200 to enhance the recovery of entrained organic particles.

In various embodiments, with continued reference to FIG. 6, the central cylinder 206 further comprises a plurality of discharge ports 208 configured to tangentially release flow from within the central cylinder 206. This tangential flow may further induce a swirling motion within the tank 200, promoting enhanced mixing and uniform distribution of the aqueous solution. The size, location, and number of discharge ports 208 can be adjusted to alter the flow pattern within the tank 200 to optimize the recovery of entrained organic particles.

The tank 200, as depicted in FIG. 6, may optionally include some or all of the various features or elements disclosed in FIGS. 1-5. While tank 200 and tank 100 described in FIGS. 1-5 are presented as separate embodiments, they may incorporate features from one another, or other features not explicitly described herein. It is to be understood that the present disclosure is not limited to the specific features described, and other variations or combinations of elements may be utilized without departing from the scope of the invention.

Figure 8:
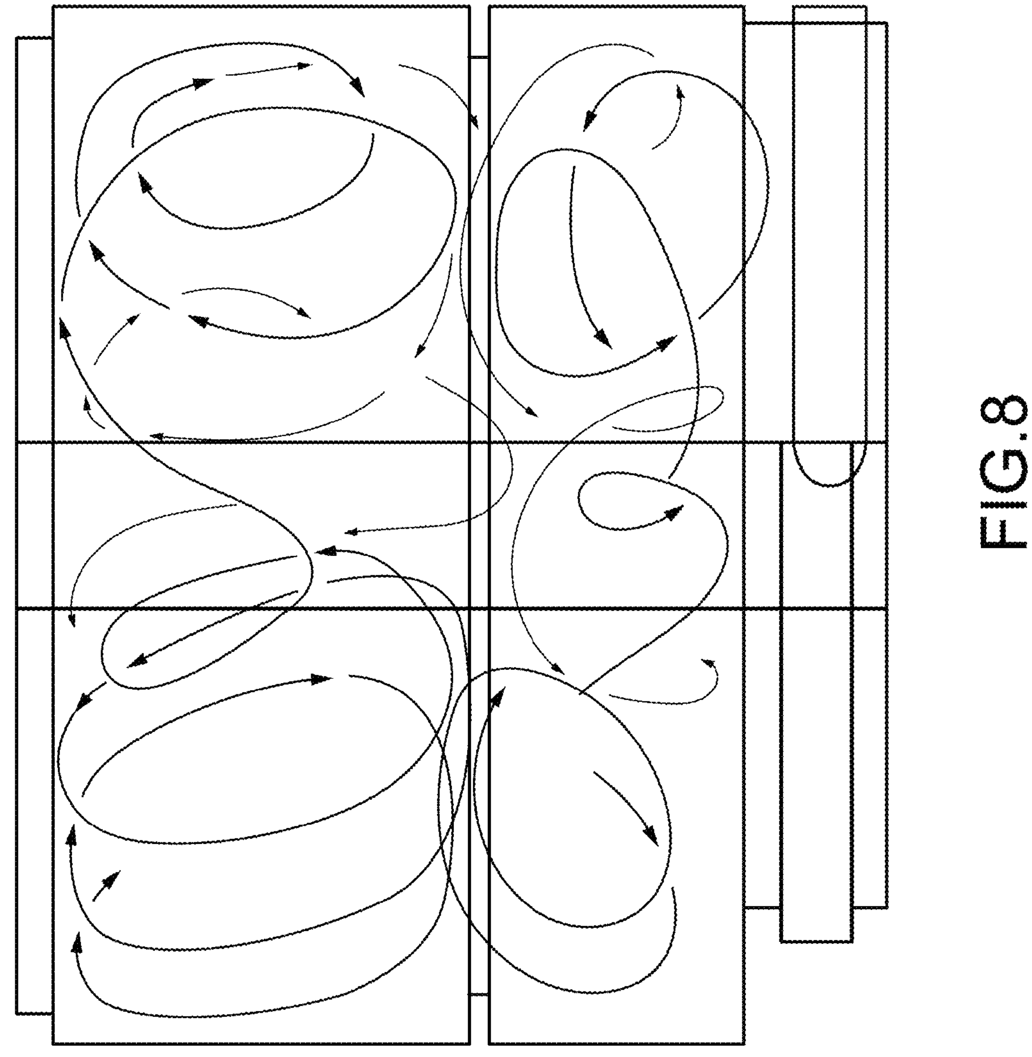
FIG. 8 is an example of a flow pattern that may be enabled by one or more embodiments in accordance with this disclosure.

An organic recovery tank, as disclosed, may improve operation of recovery tanks by changing the flow pattern of the solution within the tank, as well as providing several locations within the tank for organic particles to separate from the aqueous solution and be recovered. As an aqueous solution enters a tank in accordance with the present disclosure and as described by the exemplary embodiments, the aqueous solution experiences a torque, for example, by a plurality of impellers or a tangential inlet, causing the solution's flow stream to move in a rotational motion tangential to the tank's center vertical axis. Directing the flow stream in this way forms a low-speed and up-welling vortex within the tank, decreasing overall agitation and allowing entrained organic particles more time to separate from the solution, therefore reducing entrainment. An exemplary flow pattern of a tank in accordance with one or more embodiments of the instant invention is shown in FIG. 8.

Operation

In accordance with various aspects of the various embodiments of the instant disclosure, entrained organic may be separated from an aqueous solution by pumping the aqueous solution from an SX plant into a recovery tank 100 through an inlet 106. As the aqueous solution flows into tank 100, it hits the floor 104 of the tank 100 and flows through the curved impellers 108 configured as described above. As the aqueous solution flows out of the curved impellers 108, it begins to rotate and is directed upwards towards the surface of the tank 100 by deflector wall 110. An inner well is formed by deflector wall 110, and the static levels of aqueous solution within and outside the inner well are kept the same by equalizer pipes 136. The controlled velocity of the rotational flow allows organic particles to begin to separate out of the aqueous solution and rise to the surface of tank 100, coalescing into an organic layer. Due to the density differences between organic and aqueous solution, the organic layer floats at the surface of tank 100.

The rotational flow of the aqueous solution in tank 100 also drives the aqueous solution into the boundary wall 102 of tank 100, where entrained organic particles are caught underneath the horizontal surfaces of the discharge gallery 124 and the separation ring 126 and separate out from the aqueous solution. Accumulation zones 128 within the horizontal surfaces trap the separated organic particles to create accumulated masses of organic particles, which then travel up collection pipes 130 to be deposited on the organic layer at the surface of tank 100 or flow down the drip channels 132 extending from collection pipes 130 and into the skim launder 134.

As the solution level in tank 100 begins to rise, it comes into contact with the floating baffle system as described above. The baffles 114 are comprised of a material having a density between the aqueous solution and organic, allowing them to rest at the interface between the two. This baffle system prevents the agitation within the tank below from disturbing the organic layer, minimizing instances of re-entrainment. As described above, the baffles 114 can move freely in a vertical direction with the level of solution within the tank 100, ensuring the organic layer remains undisturbed through the entirety of the operation.

From time to time during the operation of tank 100, the solution level will be allowed to overflow, allowing the organic layer to flow into the skim launder 134 and be recovered from tank 100 for reuse.

After a sufficient amount of entrained organic particles have been removed from the aqueous solution, tank 100 begins draining. The aqueous solution is pumped out of the tank 100 for reuse in other parts of the leaching and/or SXEW process. The solution in the inner well formed by deflector wall 110 drains out into the tank 100 through equalizer pipes 136, ensuring no solution is trapped within the inner well and allowing the tank 100 to fully drain.

The present invention has been described with reference to various exemplary embodiments. However, many changes, combinations, and modifications may be made to the exemplary embodiments without departing from the scope of the present invention. For example, the various components may be implemented in alternate ways. These alternatives can be suitably selected depending upon the particular application or in consideration of any number of factors associated with the operation of the system. In addition, the techniques described herein may be extended or modified for use with other metal extraction processes. These and other changes or modifications are intended to be included within the scope of the present claims.

The present invention has been described above with reference to a number of exemplary embodiments. It should be appreciated that the particular embodiments shown and described herein are illustrative of the invention and its best mode and are not intended to limit in any way the scope of the invention as set forth in the claims. Those skilled in the art having read this disclosure will recognize that changes and modifications may be made to the exemplary embodiments without departing from the scope of the present invention. Although certain preferred aspects of the invention are described herein in terms of exemplary embodiments, such aspects of the invention may be achieved through any number of suitable means now known or hereafter devised. Accordingly, these and other changes or modifications are intended to be included within the scope of the present invention.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. Equivalent changes, modifications and variations of various embodiments, materials, compositions, and methods may be made within the scope of the present invention, with substantially similar results. The subject matter of the inventions includes all novel and non-obvious combinations and sub combinations of the various elements, features, functions, and/or properties disclosed herein.

Benefits, other advantages, and solutions to problems have been described herein with regard to specific embodiments. However, the benefits, advantages, solutions to problems, and any element or combination of elements that may cause any benefit, advantage, or solution to occur or become more pronounced are not to be construed as critical, required, or essential features or elements of any or all the claims or the invention. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A device for organic recovery comprising:

a tank comprising;

a horizontal inlet disposed proximate a floor of the tank, the horizontal inlet configured to deliver a mixed solution comprising an aqueous solution and organic particles;

a central cylinder coupled to the horizontal inlet and configured to impel a torque on the mixed solution, the central cylinder disposed about a longitudinal axis of the tank and extending vertically upward from an area proximate the floor of the tank, wherein the central cylinder comprises:

a closed lower end;

an upper end; and a sidewall comprising a plurality of orifices;

wherein in response to receiving the torque from the central cylinder, the mixed solution moves with an upward vortex flow within the central cylinder and toward a top surface of the tank;

a skim launder coupled to a boundary wall of the tank and positioned at the top surface of the tank, wherein the skim launder is configured to recover organic particles from the tank as they separate from the aqueous solution;

a plurality of baffles extending horizontally from the central cylinder to the boundary wall configured to float at an interface between the aqueous solution and a coalesced layer of organic particles, wherein the plurality of baffles impedes a rotating flow of the mixed solution at the top surface;

a plurality of central cylinder baffle guides coupled to the central cylinder; and a plurality of boundary baffle guides coupled to the boundary wall, wherein each central cylinder baffle guide in the plurality of central cylinder baffle guides has a corresponding boundary baffle guide in the plurality of boundary baffle guides, and wherein each corresponding pair is configured to restrain the horizontal movement of a baffle in the plurality of baffles.

2. The device of claim 1, wherein the central cylinder is coupled to the horizontal inlet tangentially to induce the upward vortex flow of the mixed solution about the longitudinal axis of the tank within the central cylinder.

3. The device of claim 1, wherein each orifice of the plurality of orifices is configured to allow the upward vortex flow of the mixed solution to exit the central cylinder with tangential and vertical velocity components.

4. The device of claim 1, wherein the closed lower end of the central cylinder comprises the central cylinder being coupled to the floor of the tank.

5. The device of claim 1, further comprising:
a discharge gallery positioned at the floor of the tank and configured to separate organic particles from the mixed solution;
a plurality of accumulation zones disposed within a horizontal surface of the discharge gallery, wherein each accumulation zone in the plurality of accumulation zones is a raised section of the horizontal surface and is configured to trap the separated organic particles and prevent them from remixing with the aqueous solution; and
a plurality of collection pipes extending vertically from the plurality of accumulation zones to the top surface, configured to deposit the separated organic particles on the top surface.

6. The device of claim 5, further comprising a drip channel coupled to each collection pipe in the plurality of collection pipes and positioned at the top surface, wherein the drip channel is configured to guide the separated organic particles into the skim launder.

7. The device of claim 1, further comprising a separation ring disposed horizontally along the boundary wall of the tank and positioned between the floor and the top surface, wherein the separation ring is configured to separate organic particles from the mixed solution, and wherein the separation ring comprises a plurality of accumulation zones disposed within a horizontal surface.

8. The device of claim 1, wherein the plurality of baffles comprises a density that is less than a density of the aqueous solution and more than a density of the coalesced layer of organic particles.

9. The device of claim 8, wherein each baffle in the plurality of baffles terminates at each end in an endcap, wherein the endcap is configured to restrain the baffle within each corresponding pair of baffle guides.

10. The device of claim 9, wherein each central cylinder baffle guide in the plurality of central cylinder baffle guides and each boundary guide in the plurality of boundary guides comprises:
two parallel vertically aligned bars; and
a baffle restraint configured to set an upper limit for vertical movement of the plurality of baffles within the tank, wherein the baffle restraint intersects the two parallel vertically aligned bars perpendicularly.

11. The device of claim 1, further comprising a plurality of curved impellers coupled to a floor of the tank.

12. A method for recovering entrained organic particles from an aqueous solution, comprising:
pumping, via a horizontal inlet, a mixed solution into a recovery tank, wherein the horizontal inlet is disposed proximate a floor of the recovery tank, and wherein the mixed solution comprises an aqueous solution and organic particles;
directing, via the horizontal inlet, the mixed solution toward a central cylinder coupled to the horizontal inlet and configured to impel a torque on the mixed solution, the central cylinder disposed about a longitudinal axis of the recovery tank and extending vertically upward from an area proximate the floor of the recovery tank, wherein the central cylinder comprises:
a closed lower end;
an upper end; and
a sidewall comprising a plurality of orifices;
wherein in response to receiving the torque from the central cylinder, the mixed solution moves with an upward vortex flow within the central cylinder and toward a top surface of the recovery tank;
impeding, via a baffle system, the upward vortex flow of the mixed solution at the top surface of the tank, wherein the baffle system is configured to float at an interface between the aqueous solution and a coalesced layer of organic particles, and wherein the baffle system extends horizontally from the central cylinder to a boundary wall of the tank; and
recovering, via a skim launder, organic particles from the recovery tank as they separate from the aqueous solution, wherein the skim launder is coupled to the boundary wall of the recovery tank and positioned at the top surface of the recovery tank.

13. The method of claim 12, wherein the central cylinder is coupled to the horizontal inlet tangentially to induce the upward vortex flow of the mixed solution about the longitudinal axis of the recovery tank within the central cylinder.

14. The method of claim 12, wherein each orifice of the plurality of orifices is configured to allow the upward vortex flow of the mixed solution to exit the central cylinder with tangential and vertical velocity components.

15. The method of claim 12, wherein the closed lower end of the central cylinder comprises the central cylinder being coupled to the floor of the recovery tank.

16. The method of claim 12, further comprising:
separating, via a discharge gallery, organic particles from the mixed solution, wherein the discharge gallery is positioned at the floor of the recovery tank;
preventing, via a plurality of accumulation zones, the separated organic particles from remixing with the aqueous solution, wherein each accumulation zone in the plurality of accumulation zones is a raised section of a horizontal surface of the discharge gallery; and
depositing, via a plurality of collection pipes, the separated organic particles onto the top surface, wherein each collection pipe in the plurality of collection pipes extends vertically from the plurality of accumulation zones.

17. The method of claim 16, further comprising:
guiding, via a plurality of drip channels, the separated organic particles into the skim launder, wherein each drip channel in the plurality of drip channels is coupled to a collection pipe in the plurality of collection pipes and positioned at the top surface.

18. The method of claim 16, further comprising:
separating, via a separation ring, organic particles from the mixed solution, wherein the separation ring is disposed horizontally along the boundary wall of the recovery tank and positioned between the floor and the top surface, and wherein the separation ring comprises a plurality of accumulation zones disposed within a horizontal surface.

* * * * *